United States Patent [19]

Okamura et al.

[11] Patent Number: 4,939,608
[45] Date of Patent: Jul. 3, 1990

[54] LOW-NOISE MAGNETIC READ/WRITE HEAD

[75] Inventors: Hiroshi Okamura, Tokyo; Susumu Kimura, Hamura; Masahiro Kusunoki, Tachikawa, all of Japan

[73] Assignee: Kabushiki Kaisha Toshiba, Kawasaki, Japan

[21] Appl. No.: 289,401

[22] Filed: Dec. 21, 1988

Related U.S. Application Data

[63] Continuation of Ser. No. 935,011, Nov. 26, 1986, abandoned.

[30] Foreign Application Priority Data

Nov. 30, 1985 [JP] Japan ................................ 60-269677
Dec. 27, 1985 [JP] Japan ................................ 60-295715

[51] Int. Cl.$^5$ ........................ G11B 5/265; G11B 5/187
[52] U.S. Cl. .................................... 360/121; 360/122; 360/125
[58] Field of Search ..................... 360/121, 122, 125

[56] References Cited

U.S. PATENT DOCUMENTS 4,017,899 4/1977 Bagby ................................ 360/122
4,531,170 7/1985 Takei et al. ........................ 360/122

FOREIGN PATENT DOCUMENTS 54-106051 4/1981 Japan ................................ 360/121

OTHER PUBLICATIONS

Morrison et al., "Magnetic Transducer Head", IBM Tech Disc Bull, vol. 7, No. 4, Sep. 1964, p. 333.

Primary Examiner—Robert S. Tupper
Attorney, Agent, or Firm—Finnegan, Henderson, Farabow, Garrett and Dunner

[57] ABSTRACT

Disclosed is a magnetic head apparatus, which comprises a pair of magnetic cores defining a magnetic gap for recording and reproducing information, and grooves in the lateral faces of the magnetic cores, extending at right angles to those faces of the cores which are opposed to a magnetic recording medium or which define the magnetic cores. The grooves determine the width of the magnetic gap. That face of at least one of the magnetic cores which is opposed to the recording medium, is recessed from the remaining portion of the core, so as to cover a width equivalent to the length of the grooves, at the maximum. In the magnetic head of the invention, moreover, a nonmagnetic portion is formed at least on an erase gap, so that the degree of magnetic coupling between the erase gap and the recording medium is lower than that between a read/write gap and the medium. Thus, magnetic induction, which is produced in the erase core when data is read from the medium, is reduced.

8 Claims, 5 Drawing Sheets

DIRECTION OF DISK ROTATION

LOW-NOISE MAGNETIC READ/WRITE HEAD

This application is a continuation of application Ser. No. 935,011, filed Nov. 26, 1986 now abandoned.

BACKGROUND OF THE INVENTION

The present invention relates to a magnetic head apparatus for recording on and reproducing information from magnetic recording media, and more particularly, to a magnetic head apparatus, for a floppy disk drive system.

FIGS. 1 and 2 show an arrangement of a conventional magnetic head apparatus of a floppy-disk drive system, which is used to record on and reproduce information from a flexible magnetic recording disk. FIG. 1 is a plan view showing a sliding-contact surface of the apparatus to be in contact with the disk, and FIG. 2 is a front view of the apparatus of FIG. 1 as taken in the direction of arrow P. In FIG. 2, slider 1 shown in FIG. 1 is removed from the apparatus.

The magnetic head apparatus shown in FIGS. 1 and 2 is of a tunnel-erase type, as it is called. It comprises recording/reproducing head 2, erase head 3, non-magnetic isolation layer 4 for separating heads 2 and 3, and slider 1 formed of ceramics or the like. Head 2 is composed of recording/reproducing cores 21 and 22, formed of ferromagnetic material, and coil 23, wound around cores 21 and 22. Cores 21 and 22 are formed with recording/reproducing gap 24 and grooves 25 defining the width of gap 24. Gap 24 is adapted to generate leakage flux, in a recording mode, and detect magnetic fields from the disk, in a reading mode. Erase head 3 is composed of erase cores 31 and 32 formed of ferromagnetic material, and coil 33 wound around cores 31 and 32. Cores 31 and 32 are formed with erase gap 34 and grooves 35 defining the width of gap 34. Gap 34 serves to erase both side portions of information, which is recorded on the disk by recording/reproducing head 2.

Constructed in this manner, the prior art magnetic head apparatus of the floppy-disk drive system is located in position on the magnetic recording disk, by a stepping motor or other means, when it records or reproduces information. In the playback mode, however, the apparatus is liable to fall into a so-called off-track state, such that the recording/reproducing gap 24 of the recording/reproducing head 2 is positioned of a track on the disk where the information is recorded. In such a case, grooves 25 of head 2 run on an adjacent track, and serve as wider recording/reproducing gaps, thus producing side strokes. As a result, the signal-to-noise ratio of readout signals, delivered from coil 23 of head 2, is lowered.

Some of the latest floppy-disk drive systems use a magnetic head apparatus of a pre-erase type, as shown in FIG. 3. FIG. 3 is a plan view showing a sliding-contact surface of the apparatus, in which like reference numerals are used to designate like portions as shown in FIGS. 1 and 2, for simplicity of illustration. In the magnetic head apparatus of this type, erase gap 54 is located on the upper-course side of the track, with respect to the running direction, as compared with recording/reproducing gap 24. Thus, before data is written by recording/reproducing head 2, previously stored data is erased by erase head 3.

While recording/reproducing head 2 is reading data, in the pre-erase-type magnetic head apparatus, erase head 3 runs continually on a data track, so that intensive magnetic induction occurs in erase cores 51 and 52. If cores 51 and 52 are subjected to such substantial magnetic induction, lines of magnetic force are caused to reach recording/reproducing cores 21 and 22. As a result, the readout signals from coil 23 of head 2 are hampered by noises, so that their signal-to-noise ratio is lowered.

Also in the magnetic head apparatus of the tunnel-erase type, as shown in FIGS. 1 and 2, the off-track condition causes erase gap 34 of erase head 3 to run on an adjacent track. In this case, the intensity of those magnetic fields which, generated from data stored in the adjacent track, reach gap 34 increases, so that erase cores 51 and 52 are subjected to substantial magnetic induction. Thus, the signal-to-noise ratio of the readout signals, delivered from coil 23 of recording/reproducing head 2, is lowered. (Here it is to be noted that some magnetic induction can be caused without the off-track condition.)

SUMMARY OF THE INVENTION

The object of the present invention is to provide a magnetic head apparatus, which produces only relatively low noise while reproducing information from magnetic recording media, thus enjoying an improved signal-to-noise ratio of readout signals.

In order to achieve the above object, a head apparatus for reproducing data from tracks having a defined width on a magnetic recording medium comprises;

reproducing core means for detecting magnetic fields from the recording medium, including contact surface means for sliding contact with the magnetic recording medium, having a width corresponding to the defined width of the tracks for increasing the signal to noise ratio of the apparatus, and reproducing gap means in the contact surface means for detecting the magnetic fields from the recording medium; and coil means on the reproducing core means for receiving a current induced by the magnetic fields on the tracks of the recording medium.

BRIEF DESCRIPTION OF THE DRAWINGS

The above and other objects and features of the present invention will be apparent from the following description taken in connection with the accompanying drawings, in which.

DETAILED DESCRIPTION OF THE PREFERRED EMBODIMENTS

An embodiment of the present invention will now be described with reference to FIGS. 4, 5 and 10.

Figure 4:
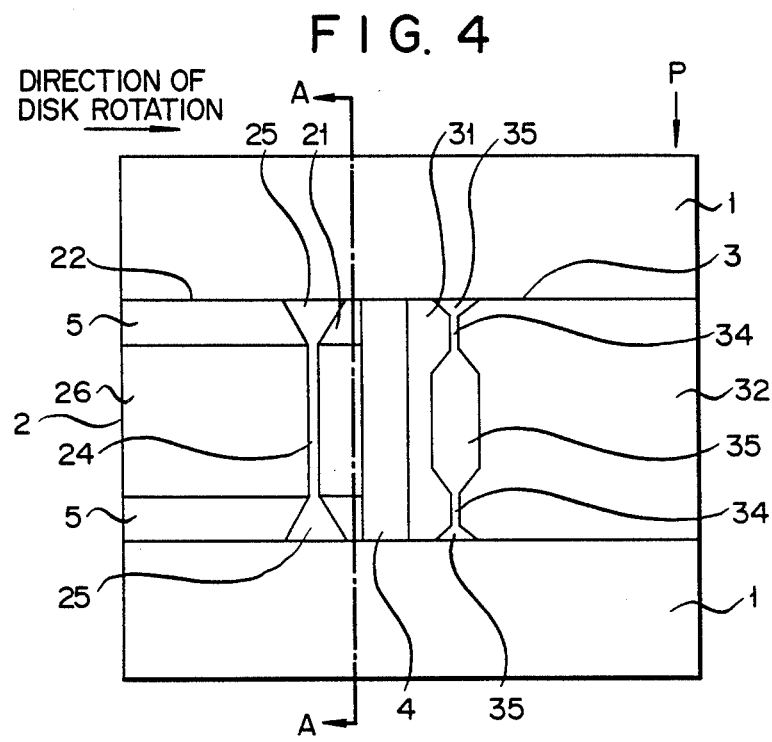
FIG. 4 is a plan view showing an arrangement of an embodiment of the present invention.
Figure 10:
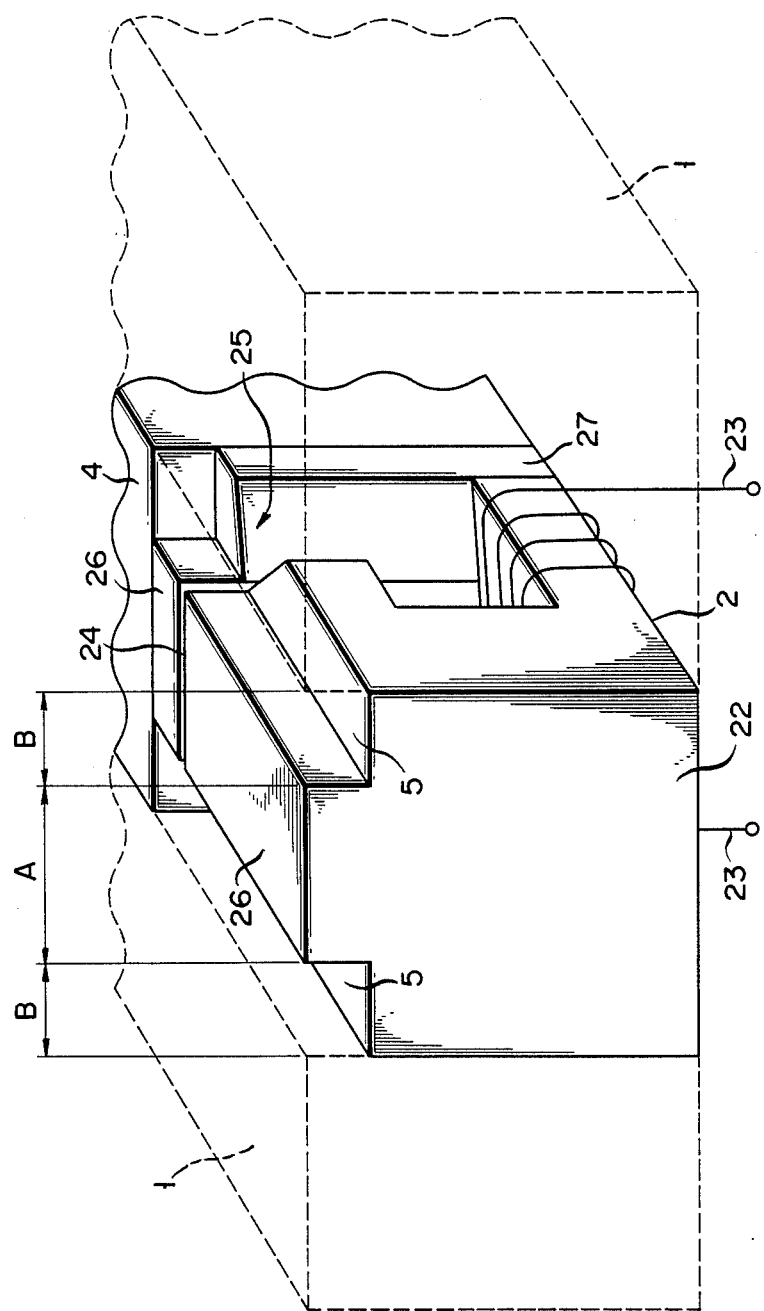
FIG. 10 is a perspective view showing an arrangement of an embodiment of the present invention.

FIGS. 4 and 10 are a plan view and a perspective view showing a sliding-contact surface of a magnetic head apparatus of a tunnel-erase type, according to the present invention, respectively. FIG. 5 is a sectional view taken along line A—A of FIG. 4. As shown in FIGS. 4 and 10, the magnetic disk apparatus comprises recording/reproducing head 2, erase head 3, nonmagnetic isolation layer 4 for separating heads 2 and 3, and slider 1 formed of ceramics or the like. Head 2 is composed of recording/reproducing cores 21 and 22 formed of ferromagnetic material, and coil 23 wound around cores 21 and 22. Cores 21 and 22 are formed with recording/reproducing gap 24, grooves 25 defining the width of gap 24, and medium contact surface 26. Gap 24 is adapted to generate leakage flux, in a recording mode, and detect a magnetic field from a magnetic recording disk, in a reading mode. Erase head 3 is composed of erase cores 31 and 32 formed of ferromagnetic material, and coil 33 wound around cores 31 and 32. Cores 31 and 32 are formed with erase gap 34 and grooves 35 defining the width of gap 34. Gap 34 serves to erase both side portions of information, which is recorded on the disk by recording/reproducing head 2.

With respect to the aforementioned components or portions, the apparatus of this embodiment is constructed in the same manner as the prior art apparatus. The magnetic head apparatus of the invention further comprises recesses 5 for reducing side crosstalk. Each recess 5 is formed in a manner such that part of the face of at least one of recording/reproducing cores 21 and 22, to be opposed to a magnetic recording medium, is lower in level than sliding contact surface 26, covering a width equivalent to the length of each groove 25, at the maximum, from each corresponding lateral face of the core.

The operation of the apparatus of the embodiment shown in FIGS. 4 and 5 will now be described.

In general, a magnetic head delivers, as an output voltage, the time-based change of magnetic flux produced by residual magnetism of a magnetic recording medium. If there is space l between head and medium, the reproduction output is reduced by $55l/\lambda$ (dB), where $\lambda$ is the recording wavelength.

If recording/reproducing cores 21 and 22 and erase cores 31 and 32 are off a track of the recording medium, on which information is recorded, grooves 25, defining the width of recording/reproducing gap 24, are located on an adjacent track. Thus, grooves 25 reproduced information on the adjacent track. In this case, the reproduction output from grooves 25 is lower, by $55l/\lambda$, than the output obtained when neither of grooves 25 is formed with the recess of length l. Thus, the incidence of side crosstalk, attributable to grooves 25, can be lowered.

Figure 5:
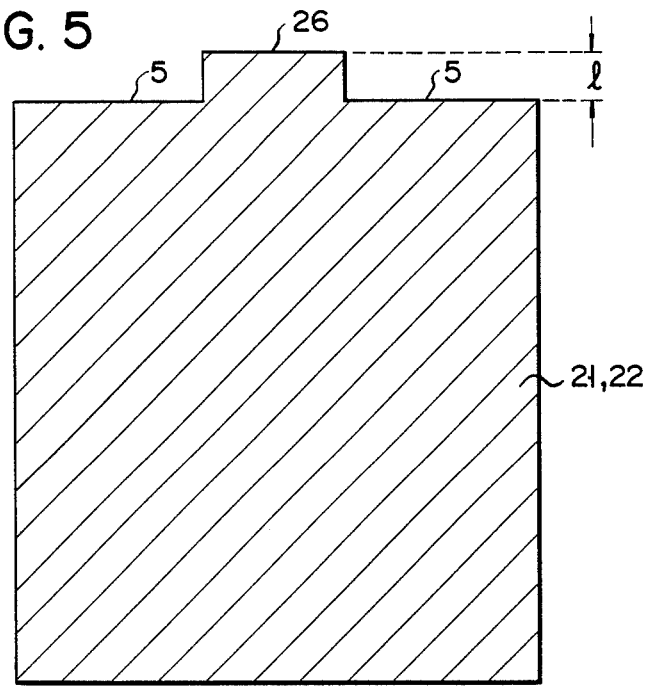
FIG. 5 is a sectional view taken along line A—A of FIG. 4.
Figure 6:
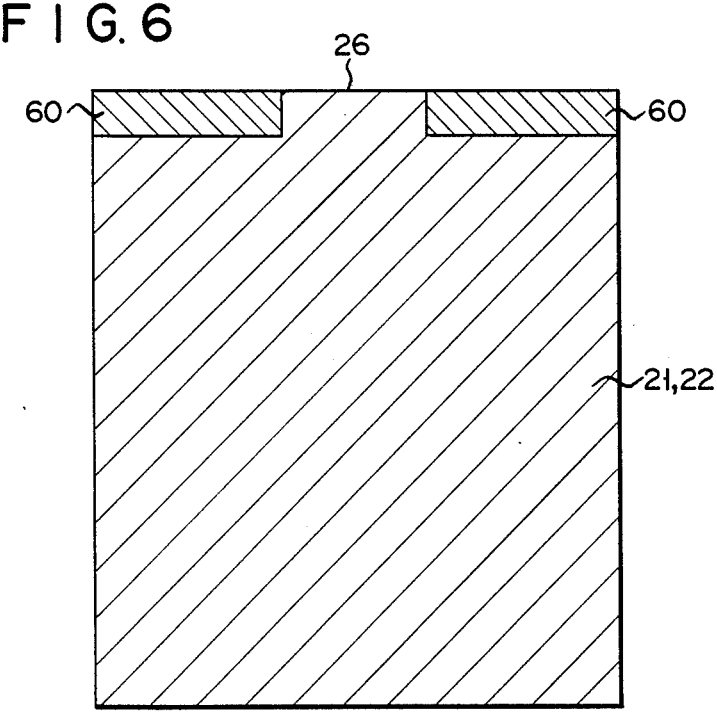
FIG. 6 is a sectional view showing a modification of the embodiment shown in FIG. 5.

FIG. 6 is a sectional view showing a modification of the embodiment shown in FIG. 5. In this modification, recesses 5 shown in FIG. 5 are filled individually with nonmagnetic layers 60. Other portions are arranged in the same manner as shown in FIGS. 4 and 5.

Figure 1:
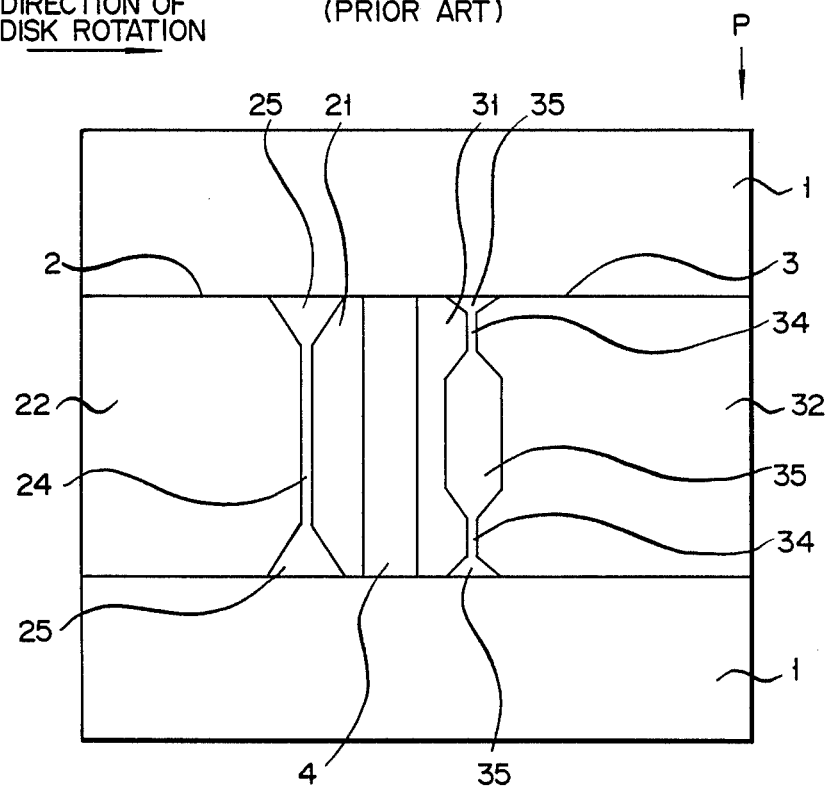
FIG. 1 is a plan view showing a sliding-contact surface of a prior art magnetic disk apparatus.
Figure 2:
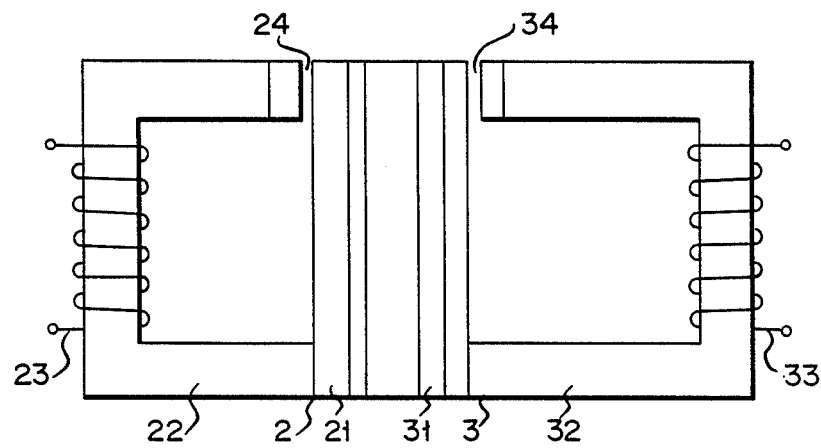
FIG. 2 is a front sectional view of the magnetic head apparatus of FIG. 1 as taken in the direction of arrow P.
Figure 3:
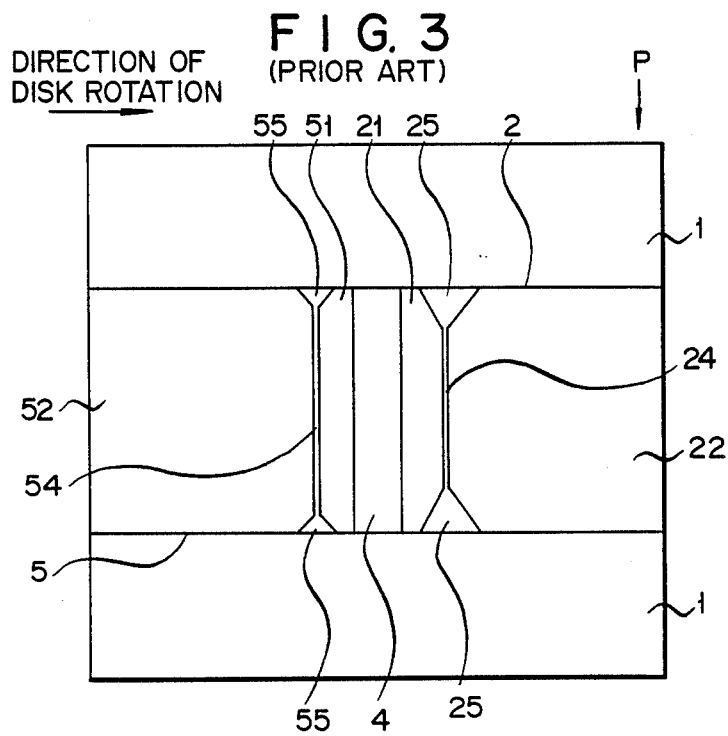
FIG. 3 is a plan view showing a sliding-contact surface of a prior art magnetic head apparatus of a pre-erase type.
Figure 7:
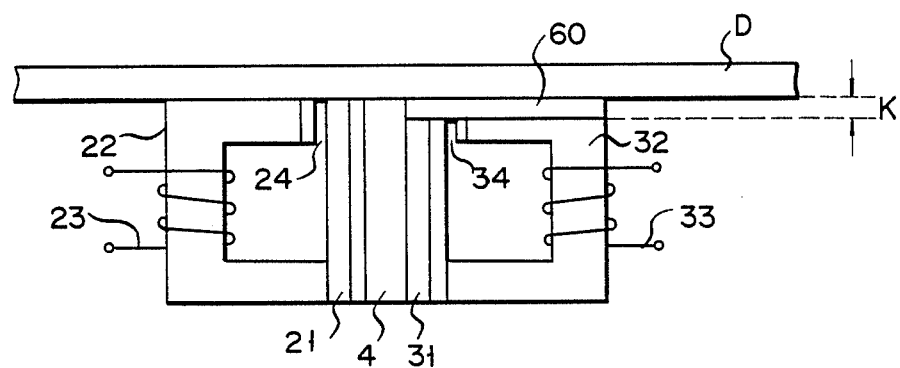
FIG. 7 is a front view showing a magnetic head apparatus according to another embodiment of the invention.

FIG. 7 is a front view showing an arrangement of another embodiment of the present invention. In FIG. 7, like reference numerals are used to designate like portions as shown in FIG. 2. In this modification, recording/reproducing cores 21 and 22 are formed with recording/reproducing gap 24 for reading and writing data, facing magnetic disk D. Erase cores 31 and 32 are formed with erase gap 34 for erasing part of the data written in disk D by gap 24, also facing the disk. Cores 21 and 22 are connected to cores 31 and 32 by means of isolation layer 4. Coil 23 is wound around cores 21 and 22, and coil 22 around cores 31 and 32.

In the magnetic head apparatus of this embodiment, recording/reproducing cores 21 and 22 and erase cores 31 and 32 are joined together so that erase gap 34 is located farther, by distance k, from magnetic disk D than recording/reproducing gap 24 is, and nonmagnetic layer 60 is formed over gap 34.

If the magnetic head falls into the off-track state, as described above, recording/reproducing cores 21 and 22 interfere magnetically with erase cores 31 and 32, so that reproduced signals from coil 23, wound around cores 21 and 22, are interfered with noise. Since distance k is kept between erase gap 34 and magnetic disk D, however, the intensity of the magnetic fields reaching gap 34 can be lowered. Naturally, therefore, magnetic induction in cores 31 and 32 is reduced. Accordingly, the magnetic interference between erase cores 31 and 32 and recording/reproducing cores 21 and 22 is decreased, so that the reproduced signals from coil 23 are interfered with less noise.

Figure 8:
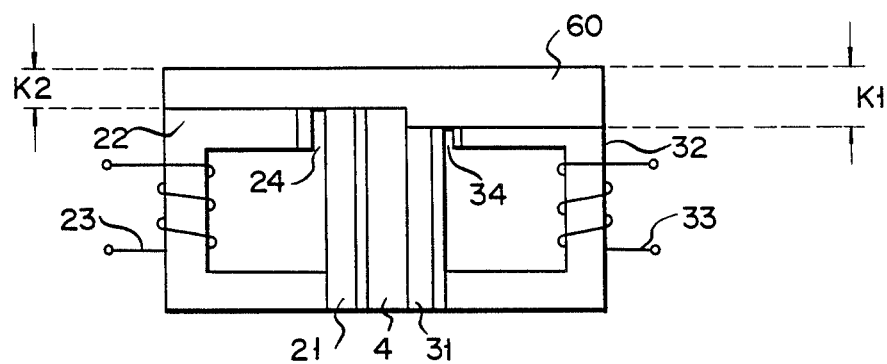
FIG. 8 is a front view showing a modification of the second embodiment shown in FIG. 7.

FIG. 8 is a front view showing a modification of the embodiment shown in FIG. 7.

In the embodiment of FIG. 7, nonmagnetic layer 60 is formed only on erase gap 34. In the modification of FIG. 8, however, layer 60 is formed also on recording/reproducing gap 24. Thickness k1 of layer 60 on gap 34 is greater than thickness k2 of layer 60 on gap 24. Also in this case, the intensity of magnetic fields reaching gap 34 can be lowered.

Figure 9:
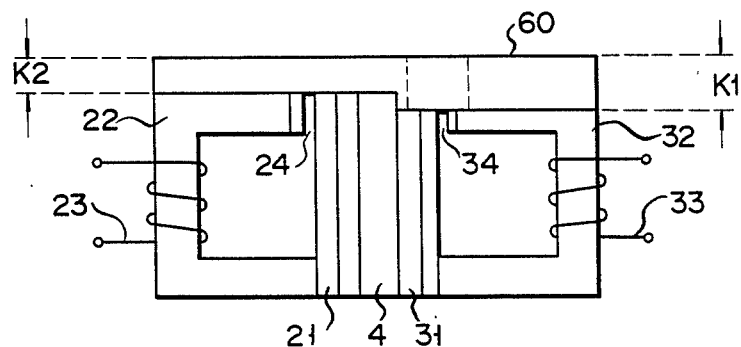
FIG. 9 is a front view showing another modification of the embodiment shown in FIG. 8.

FIG. 9 is a front view showing another modification of the embodiment shown in FIG. 7.

In the modification of FIG. 9, nonmagnetic layer 60 is formed so as to surround erase gap 34. In this case, layer 60 is not located over gap 34, and a layer of air is formed between magnetic disk D and gap 34, surrounded by layer 60. The air layer serves as a nonmagnetic layer, which can lower the degree of magnetic coupling between disk D and gap 34.

Any of the above-described embodiments or modifications may be applied to a magnetic head, in consideration of manufacturing processes and costs, as required. It is to be desired, in general, that the sliding friction between the magnetic head and disk D should be small. Therefore, the face of the head opposed to the disk should be as even as possible. The degree of magnetic coupling between erase gap 34 and disk D can be lowered by only joining recording/reproducing cores 21 and 22 with erase cores 31 and 32 so that gap 34 is located farther from disk D than recording/reproducing gap 24 is. In this case, however, the indented faces of the cores can exert a bad influence upon the slide of the magnetic head, on disk D. In the embodiments described above, therefore, nonmagnetic layer 60 is formed over the indented faces.

In the above described embodiments, nonmagnetic layer 60 is made of only one material. When forming layer 60 on each of erasure gap 34 and recording/reproducing gap 24, however, two materials with different permeabilities may be used for the layers. In this case, the degree of magnetic coupling between gap 34 and disk D can be made lower than that between gap 24 and disk D, even though the two nonmagnetic layers have the same thickness.

According to the above embodiments, moreover, the present invention is applied to a magnetic head apparatus of the tunnel-erase type. Alternatively, however, the invention may be applied also to a magnetic head apparatus of the pre-erase type.

What is claimed is:

1. A magnetic head apparatus comprising;
   recording/reproducing head means for recording data on a magnetic recording medium and reproducing data from the medium;
   erasing head means disposed adjacent the recording/reproducing head means, for erasing data from the recording medium, including erasing core means having an erasing gap means for generating magnetic flux to erase data recorded on the medium thereby, coil means on the erasing core means, non-magnetic spacer means between the erasing core means and the recording medium for decreasing the intensity of magnetic fields extending from the recording medium on the erasing gap means, the non-magnetic spacer means covering the erasing gap means; and
   isolation layer means for magnetically separating the recording/reproducing head means from the erasing head means.

2. The magnetic head apparatus according to claim 1, wherein said non-magnetic spacer means includes means defining an aperture positioned over the erasing gap means.

3. The magnetic head apparatus, according to claim 1, wherein said non-magnetic spacer means is also formed over the recording/reproducing gap, the non-magnetic spacer means formed over the erase gap being thicker than that over the recording/reproducing gap.

4. The magnetic head apparatus according to claim 3, wherein said non-magnetic spacer means includes means defining an aperture positioned over the erasing gap means.

5. The head apparatus according to claim 3, wherein the non-magnetic spacer means includes a first non-magnetic layer covering the recording/reproducing gap and a second non-magnetic layer of different permeability from the first non-magnetic layer covering the erase gap.

6. The head apparatus according to claim 5, wherein the thickness of the first non-magnetic layer is the same as that of the second non-magnetic layer.

7. A magnetic head apparatus comprising:
   recording/reproducing head means for recording data on a magnetic recording medium and reproducing data from the medium;
   erasing head means for erasing data from the recording medium, including erasing core means having an erasing gap means for generating magnetic flux, coil means on the erasing core means, non-magnetic spacer means between both the recording/reproducing gap and the erasing core means and the recording medium for decreasing the intensity of magnetic fields from the recording medium on the erasing gap means, the portion of said non-magnetic spacer means formed over the erase gap being thicker than the portion of the non-magnetic spacer means formed over the recording/reproducing gap; and
   isolation layer means for magnetically separating the recording/reproducing head means from the erasing head means.

8. The magnetic head apparatus according to claim 7, wherein said non-magnetic spacer means includes means defining an aperture positioned over the erasing gap means.

* * * * *